United States Statutory Invention Registration [19]

[11] Reg. Number: H923

Carlon [43] Published: Jun. 4, 1991

[54] ACCELERATED FABRIC DRYING AND DECONTAMINATING APPARATUS AND METHOD

[75] Inventor: Hugh R. Carlon, Fallston, Md.

[73] Assignee: The United States of America as represented by the Secretary of the Army, Washington, D.C.

[21] Appl. No.: 437,970

[22] Filed: Nov. 13, 1989

[51] Int. Cl.[5] ..... A47L 15/48

[52] U.S. Cl. ..... 34/1

*Primary Examiner*—Charles T. Jordan
*Assistant Examiner*—Michael Carone
*Attorney, Agent, or Firm*—Anthony T. Lane; Edward Goldberg; Michael C. Sachs

[57] ABSTRACT

An apparatus and method for accelerated drying and decontamination of wetted fabric and material. A pair of metal electrodes electrically isolated from each other by a "U" shaped insulating frame is used to hold the wetted fabric in an electric field of between $10^3$ and $10^4$ volts per centimeter.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ACCELERATED FABRIC DRYING AND DECONTAMINATING APPARATUS AND METHOD

GOVERNMENT INTEREST

The invention described herein may be manufactured, used and licensed by or for the Government for Governmental purposes without the payment to me of any royalty thereon.

BACKGROUND OF THE INVENTION

The present invention relates to an apparatus for quickly drying fabrics or other materials in an electric field.

Various means have been used in the past to dry or decontaminate military gear and clothing wetted with organic or inorganic liquids. One of the problems of evaporatively decontaminating fabrics wetted with high boiling point material such as oil by means of heating in an oven is the length of time it takes to heat the treated surface up to a temperature where the contaminating fluid has a high vapor pressure. For organics such as oil and chemical agents the combination of higher heat and long time required to raise the wetted material to a level so that the contaminant evaporates, frequently causes the material to lose some of its desired protective properties and life expectancy.

The present invention is superior to the prior art apparatus and method of using heat or natural evaporation because the electric field current carries the liquid molecule away from the contaminated surface directly and efficiently, as against indirectly, and thus inefficiently, by having to heat the wetted surface up to a temperature where the liquid has a large vapor pressure.

SUMMARY OF THE DISCLOSURE

The present invention relates to an apparatus for holding a pair of metal plates electrically isolated from each other by a non-conducting support member having an electrically heated reduced midsection area. The electrified metal plate or plates support thereon a wetted article to be dried or decontaminated. This apparatus is but one possible configuration that demonstrates the principle. Many other configurations will be obvious to those skilled in the art.

An object of the present invention is to provide an apparatus for electrostatically drying fabrics wetted with organic or inorganic liquids.

Another object of the present invention is to provide an apparatus that greatly accelerates drying of materials wetted by organic or inorganic liquids compared to natural evaporation.

Another object of the present invention is to provide an apparatus for evaporatively decontaminating clothing wetted with a nerve agent at greatly accelerated rates.

A further object of the present invention is to provide a method accelerating the drying of fabrics and other materials by using a high voltage electric field.

For a better understanding of the present invention, together with other and further objects thereof, reference is made to the following descriptions taken in connection with the accompanying drawings.

BRIEF DESCRIPTION OF THE DRAWINGS

Throughout the following description, like reference numerals are used to denote like parts of the drawings.

DESCRIPTION OF THE PREFERRED EMBODIMENT

Figure 1:
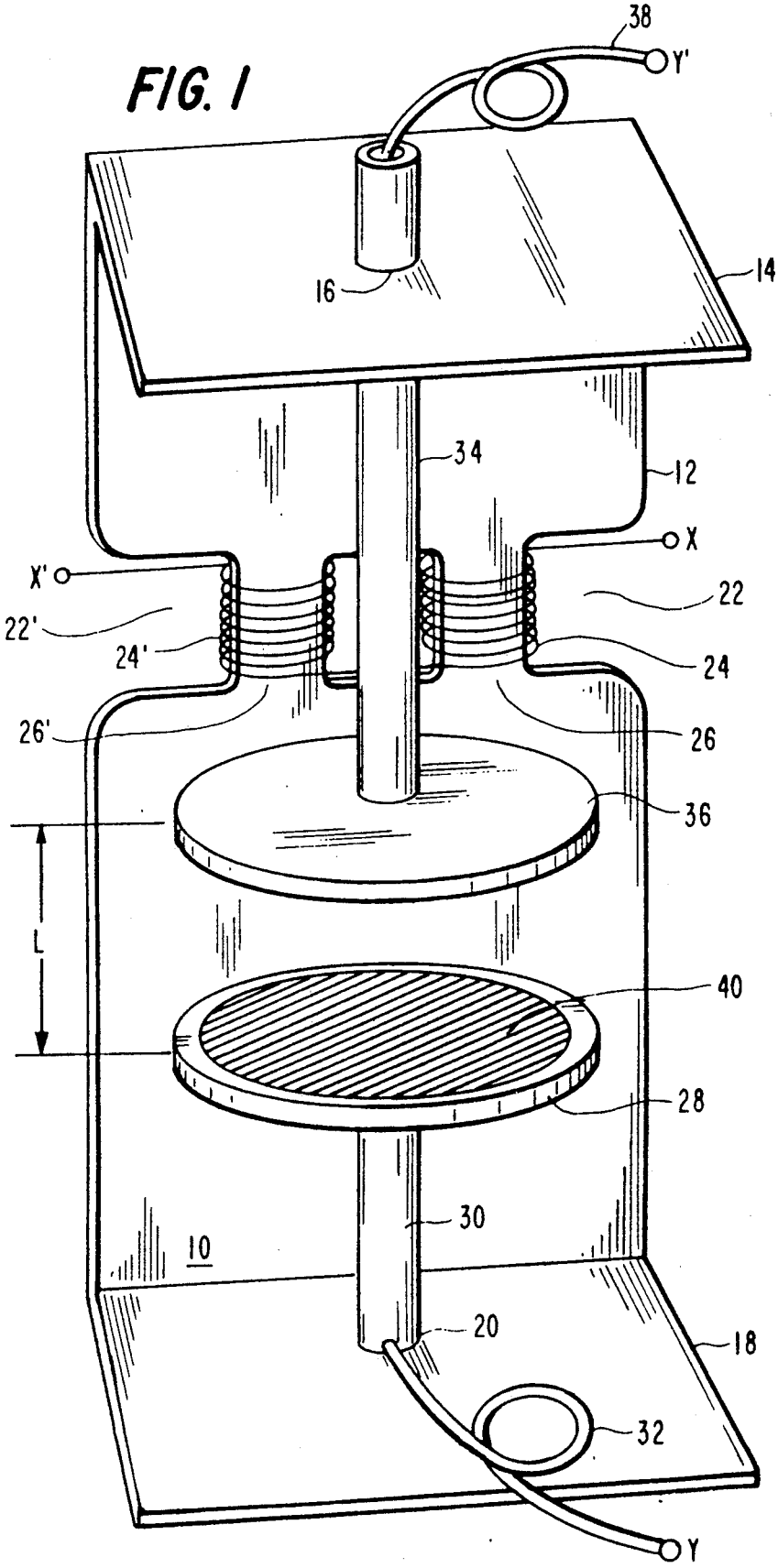
FIG. 1 is an isometric view of the accelerated fabric drying and decontaminating demonstration apparatus.

Referring now to FIG. 1, the present invention has a "U" shaped supporting insulator frame 10 having a vertical section 12, an upper horizontal support member 14 integrally connected to the vertical section 12 having a centrally disposed rod hole 16 therein, and a lower horizontal support member 18 integrally connected to the vertical section 12 having a centrally disposed rod hole 20 therein which is in axially alignment with rod hole 16. The insulator frame may be made of material such as polystyrene. The vertical section 12 has a notched cut-out coil support section 22 and 22' therein for holding series wound electrical heater coil wires 24, 24' on frame coil support legs 26, 26' respectively. A fixed stainless steel disc shaped electrode member 28 is horizontally supported on a stainless steel rod 30 which is fixedly held in the lower horizontal support member rod hole 20. A high voltage connecting wire 32 is electrically connected to rod 30. A second adjustable stainless steel rod 34 is slidable positioned in the upper horizontal support member hole 22 and has a second stainless steel disc electrode 36 supported on one end thereof so that it is parallel to electrode disc 28 and axially aligned therewith. A high voltage connecting wire 38 is electrically connected to the other end of rod 34.

In operation a wetted fabric 40 is positioned on electrode 28. Either an AC or DC voltage is applied to heater terminals x, x'. The heater coil voltage is adjusted to keep the surface of the plastic under it at least 100° C. A high voltage source is applied to terminals y, y'. The distance L between electrodes 28 and 36 is adjusted to give the needed field strength (V/cm). The heater coils on the insulator prevent surface water layer adsorption and electrical leakage between electrodes 28 and 36 and their connected rods 30 and 34 respectively. It has been observed that this device has shown a $10^3$–$10^4$ increase in evaporation rate from linen and other wetted substrates. A current meter, not shown, is connected with the high voltage supply and terminals y or y' of the apparatus.

Figure 2:
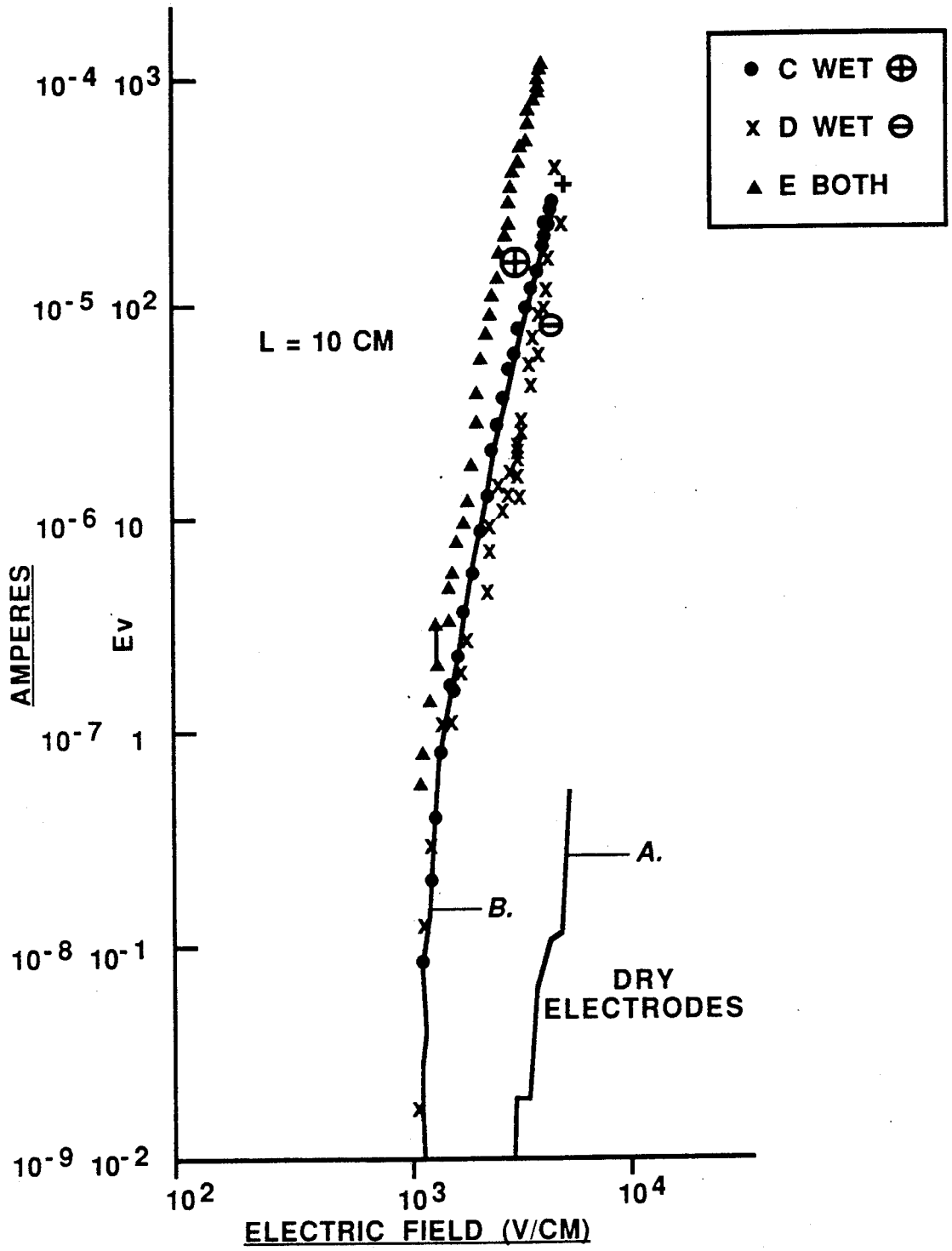
FIG. 2 is a plot of electric field applied to the electrodes of FIG. 1 versus the current in amperes measured on a meter when a linen or cotton fabric wet with water is alternatively placed on one and both electrodes.

Referring now to FIG. 2, experimental data was taken for linen substrates wetted with water and placed on either or both electrodes 28, 36. Curve A shows that only a very small current flows when no substrates are on the electrode discs, or with a dry substrate on the bottom disc 28 and electric fields of several thousand volts/cm are applied. However, curve B shows when the linen or cotton substrates are even slightly wetted with water, an enormous increase of three to four orders of magnitude is observed. Further, although the polarity of the wetted electrode disc has a minor effect, when both discs are wetted the current is larger than for either alone. A positive disc polarity works best, indicating that water ion species like $H^+(H_2O)_c$ are repelled away from a like-charged electrode in larger numbers than are negative water ions. It has been observed that linen and other substrates saturated with water dried completely in a few minutes compared to an hour or more with no electric field applied. If a paddle of insulator material is passed between the discs with a current flowing, the current can be made to drop to the dry electrode value by blocking the entire area of the discs, or to some intermediate current depending on what fraction of the disc area is blocked. Thus it was observed the paddle was able to block completely the flow of charge carriers (water ions) from one electrode disc to the other.

Figure 3:
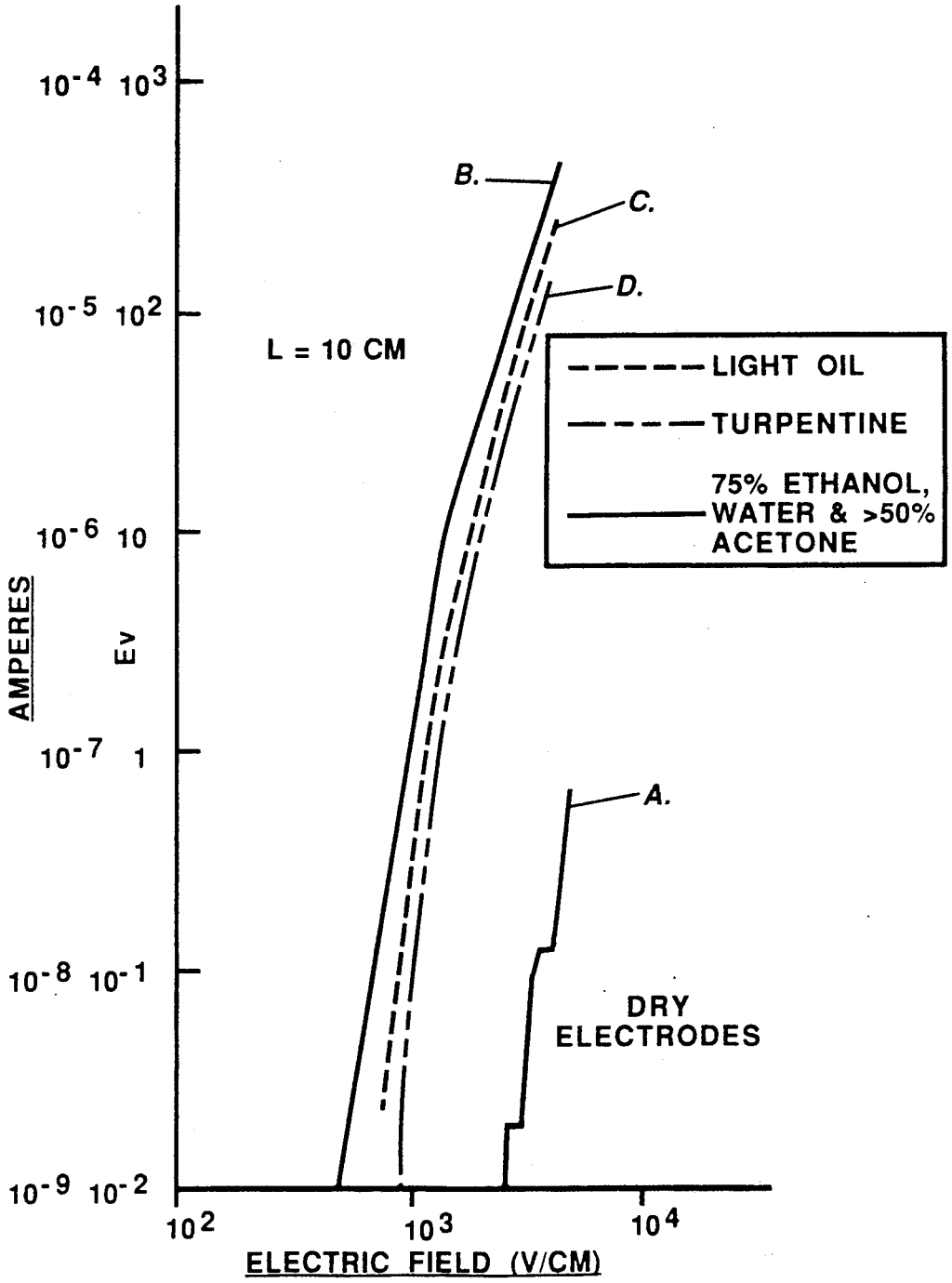
FIG. 3 is a plot of electric field applied to the electrodes of FIG. 1 versus the current in amperes measured on a meter when a linen or cotton sample is wetted with different type liquids.

Referring now to FIG. 3 data was obtained when similiar conditions like those for water shown in FIG. 2 were repeated for light oil, turpentine, water solutions of ethanol and acetone and the dry electrode. Curves B, C and D show that all of these aforementioned liquids produce large current compared to dry electrode currents, Curve A, but it was observed that water was most effective of all.

It has been clearly established that electrostatic drying can be employed with fabrics wetted with organic or inorganic liquids, and that greatly accelerated drying can be achieved compared to natural evaporation.

While a specific embodiment of the invention has been shown and described in detail to illustrate the application of the principles of the invention, it will be understood that the invention may be embodied otherwise without departing from such principles.

What is claimed is:

1. An apparatus for accelerated drying and decontamination of wetted fabric and material which comprises:

insulator frame means for holding said fabric in an electrostatic field;

heater means operatively disposed on a vertical section of said frame means for reducing electrical leakage and for preventing surface water layer absorption on said frame means;

fixed electrode means operatively attached to said frame means for holding said wetted fabric thereon;

slideable electrode means adjustably attached to said frame means, in axial alignment with said fixed electrode means for adjusting the gap distance between said fixed electrode means and said slideable electrode means and for exerting a field strength between said slideable electrode means and said wetted fabric to promote the flow of charge carriers, water ions, from said fixed electrode means to said slideable electrode means thereby greatly accelerating the drying of said wetted fabric when compared to the drying time under natural evaporation.

2. An apparatus for accelerated drying as recited in claim 1 wherein said insulator frame means comprises:

a vertical section having notched cut-out coil support members positioned thereon;

an upper horizontal support member integrally connected to one end of said vertical section, said horizontal support member having a centrally disposed hole located therein; and a lower horizontal support member integrally connected to the other end of said vertical section, having a centrally disposed rod hole located therein in axial alignment with said centrally disposed hole of said upper horizontal support member.

3. An apparatus as recited in claim 2 wherein said heater means comprises a series wound electrical heater coil wires operatively disposed on said notched cut-out coil support members, said heater coils capable of raising a portion of said vertical section of said insulator frame to a temperature of 100° C.

4. An apparatus as recited in claim 3 wherein said fixed electrode means comprises:

a first stainless steel rod fixedly held in the rod hole of said lower horizontal support member;

a first high voltage wire electrically connected to one end of said fixedly held rod; and a fixed stainless steel disc shaped electrode member horizontally supported on the other end said fixedly held first rod.

5. An apparatus as recited in claim 4 wherein said slideable electrode means includes:

a second stainless steel rod slideably held in the rod hole of said upper horizontal support member, said second rod disposed in axial alignment with said fixed electrode means;

a second high voltage wire electrically connected to one end of said second steel rod; and a second stainless steel disc shaped electrode member horizontally supported on the other end of said slideable second rod in axial alignment with said fixed stainless steel disc.

6. A method for accelerated wetted fabric drying and decontamination which comprises the steps of:

constructing a "U" shaped insulator frame having a vertical notched cutout coil section therein;

integrally attaching a lower horizontal insulator support member, having a centrally disposed rod hole therein, to one end of said vertical section;

integrally attaching an upper horizontal insulator support member, having a centrally disposed rod hole therein, to the other end of said vertical section;

fixedly holding a first disc electrode in said lower insulator support member;

slideably positioning a second disc electrode in said upper insulator support member;

winding heater coils on said notched coil section;

applying a voltage to said heater coil to raise the temperature of said vertical notched cut-out coil section to a least 100° C.;

placing the wetted fabric to be decontaminated on said first disc electrode;

adjusting the gap distance between said fixed and slidable electrode discs; and applying a high voltage to said fixed and slidable electrodes to provide a field strength of between $10^3$ and $10^4$ volts per centimeter.

* * * * *